United States Patent [19]

Dorman

[11] Patent Number: 4,963,963
[45] Date of Patent: Oct. 16, 1990

[54] INFRARED SCANNER USING DYNAMIC RANGE CONSERVING VIDEO PROCESSING

[75] Inventor: William J. Dorman, Columbia, Md.

[73] Assignee: The United States of America as represented by the Secretary of the Air Force, Washington, D.C.

[21] Appl. No.: 705,836

[22] Filed: Feb. 26, 1985

[51] Int. Cl.⁵ .................... H04N 5/33; G02B 26/10; H01L 25/00
[52] U.S. Cl. .................................. 358/113; 358/171; 250/332; 250/334
[58] Field of Search ..................... 250/332, 334, 252.1; 358/113, 171

[56] References Cited

U.S. PATENT DOCUMENTS

| | | | |
|---|---|---|---|
| 3,130,308 | 4/1964 | Astheimer | 250/334 |
| 3,935,382 | 1/1976 | Hunt | 358/113 |
| 3,937,962 | 2/1976 | Faulhaber et al. | 250/346 |
| 3,971,886 | 7/1976 | Chow | 358/113 |
| 4,048,500 | 9/1977 | Moore | 250/350 |
| 4,153,837 | 5/1979 | Ross | 250/343 |
| 4,178,522 | 12/1979 | MacLennan et al. | 250/334 |

Primary Examiner—Stephen C. Buczinski
Attorney, Agent, or Firm—Gerald B. Hollins; Donald J. Singer

[57] ABSTRACT

A video scanning and signal processing arrangement usable with devices such as a forward looking infrared system. The signal processing disclosed employs an analog-to-digital converter of limited dynamic range and incorporates plural closed loop signal modifying for optimizing the use of this limited dynamic range.

21 Claims, 3 Drawing Sheets

INFRARED SCANNER USING DYNAMIC RANGE CONSERVING VIDEO PROCESSING

RIGHTS OF THE GOVERNMENT

The invention described herein may be manufactured and used by or for the Government of the United States for all governmental purposes without the payment of any royalty.

BACKGROUND OF THE INVENTION

This invention relates to the field of video signal collecting and modification using analog and digital electrical signal processing.

In the utilization of video signals and other information originating in an out-of-doors or natural environment, electrical signals of large dynamic range are often encountered. The processing of these large dynamic range signals with electronic components inherently having limited dynamic range has presented a challenge since the inception of the electronic art and has usually required specialized processing arrangements which are tailored to suit each newly-developed information collecting system.

An emerging class of information system of this type which involves particularly extreme and demanding processing requirements is concerned with the infrared scanning used for night vision or heat source detection in military electronic systems. Typical systems of this type include the infrared scanners employed in missile guidance systems, aircraft avionics, and night surveillance systems used in ground-based and airborne military equipment. A particular example of such systems is the forward looking infrared scanning (FLIR) system used in United States Air Force aircraft for target detection, terrain viewing, weather surveillance and other human and computer-related data collection tasks.

Once the magnitude of collected signal has been amplified to moderate levels in systems of this type, it becomes desirable to extract from the total video signals, to the best degree possible, the components which contain most of the information of interest and to discard the relatively constant components which complicate the subsequent amplification and high level processing circuits of the system; usually this involves saving the transient or alternating current of a collected undulating signal and discarding or ignoring direct current reference portion of the signal. This separation is often achieved by way of some form of alternating current (AC) coupling of the video signal in an amplifier stage. Such AC coupling permits the total dynamic range of the subsequent amplifiers and other signal processing elements to be devoted to usable information-bearing signal rather than wasted on components that are constant and possibly unneeded or undesired in the later following display or signal utilizing device. AC coupling of this type is commonly employed in radio, television, telephone and other communications systems.

For video systems involving human viewing or other mass interpretation of collected signals, the absence of a removed DC reference component in the finally processed video signal can, however, present some unexpected and undesired results, including the inability of such reference-free signals to distinguish between constant backgrounds such as a sky and a desert. Usually this condition calls for the reinsertion of a DC or reference signal component having characteristics that acceptably substitute for the removed DC reference level signal in the environment being considered. Reinsertion of the DC or reference signal is usually accomplished late in the system signal processing and involves use of an artificial or compromise reference signal having something other than one-to-one relationship with the previously removed reference signal. Arrangements of this type are called DC restorers and are commonly employed in television receivers, for example, near the output of the video amplifier or at the input of the cathode ray tube display.

The present specification is concerned with a signal processing system of this type which finds particular utility in a forward looking infrared (FLIR) military aircraft system. In this presently disclosed system, digital processing involving an analog-to-digital converter limited by present state-of-the-art dynamic range capabilities is employed.

An additional aspect of this type of information collecting system relates to the type of light to electrical transducer employed for collecting the large dynamic range signals. Clearly the television art has provided capable devices of the Vidicon and Image Orthicon and related types which provide desirable transducer characteristics in the environment associated with television. For military uses, however, where size, weight, reliability, rugged use conditions and infrared sensitivity are important, transducers of the solid state type are found to be more desirable.

A particularly desirable form of these solid state transducers consists of a linear array of discrete solid state mercury-cadmium-telluride detector elements arranged to incorporate an optical system and mechanical scanning. The small physical size, infrared sensitivity, and inherent reliability of such solid state transducers provide a desirable signal source for equipment used in aircraft. A lack of uniformity between successive transducer elements of this type, however, requires consideration in video systems using transducers of this type. This uniformity characteristic is considered in the presently disclosed apparatus.

The U.S. Patent art discloses several examples of infrared and other information collecting systems which consider the ramifications of signal processing and the use of restored reference signals in performing signal processing. In particular. the patent of Kenneth L. Moore, U.S. Pat. No. 4,048,500, discloses a system for eliminating background signals in an infrared measuring system. The Moore system employs operational amplifier principles for subtracting a reference signal of proper amplitude, phase, and frequency from the composite of background plus signal radiation. A reference signal having the same frequency as the signal received from a source under investigation is generated in the Moore apparatus; the phase and amplitude of this reference signal is also adjusted to correspond with the detected signal. The detected signal and the reference signal in the Moore apparatus are summed to generate a zero level. Following this summation a subsequent target signal will then provide a signal which is free of background noise. The Moore apparatus contemplates the use of a reference infrared source coupled to the electronic processing apparatus by way of a separate transducer; both the separate and primary transducers are modulated by a shutter or episcotistor deVice and employ electrical wave filters tuned to the frequency of the modulating shutter.

The patent of Thaddeus C. Ross, U.S. Pat. No. 4,153,837, discloses an infrared optical gas analyzer system which compares the infrared transmittance of two optical paths. One of these optical paths passes through a sample cell of unknown gas concentration and the other path passes through a reference cell. The difference in optical transmittance between these paths provides a measure of the gas concentration in the sample cell. The Ross apparatus includes signal switching and automatic gain control along with integration of the processed signal and output display by way of a meter.

The patent of Reimar Fulhaber et al. U.S. Pat. No. 3,937,962, also discloses an infrared operated gas analyzer using separate sample and reference signal paths and a signal chopper arrangement. The Fulhaber apparatus also includes comparison of a sample analyzing and a reference signal.

The Fulhaber, Ross and Moore references do not, however, teach the use of combined gain equalization and bias correction using dual level biasing based upon signal difference between a scene and a thermal reference signal pair.

SUMMARY OF THE INVENTION

An object of the present invention is to provide a video signal processing arrangement which is capable of optimally using signal processing components, such as an analog-to-digital converter, having limited dynamic range.

Another object of the invention is to provide a video signal processing arrangement capable of operating with realistically obtainable solid state sensors.

Another object of the invention is to provide a video processing system which employs AC coupling in combination with a pair of thermal reference signal sources.

Another object of the invention is to provide a video signal processing arrangement which realizes the benefit of multiple signal feedback paths for signal enhancement and dynamic range containment.

Another object of the invention is to provide a signal processing arrangement usable with a variety of signal sources such as infrared scanners and in a variety of signal utilization environments.

Another object of the invention is to provide a video signal processing arrangement which employs serially organized scan data in a plurality of feedback arrangements.

BRIEF DESCRIPTION OF THE DRAWINGS

FIG. 1, which includes the portions 1A and 1B, is a block diagram of an infrared signal collecting and processing apparatus.

DETAILED DESCRIPTION

Figure 1A:
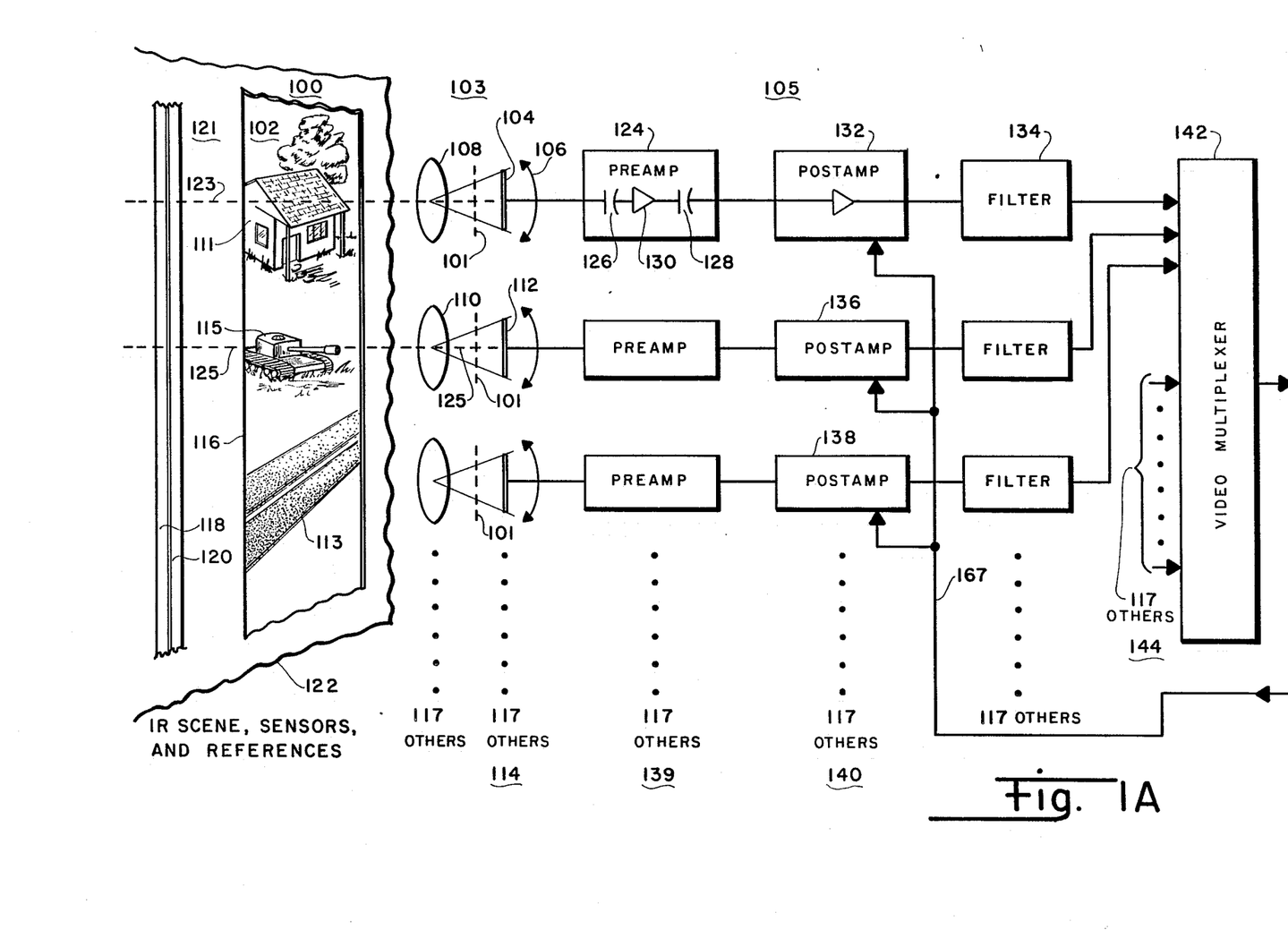
Figure 1B:
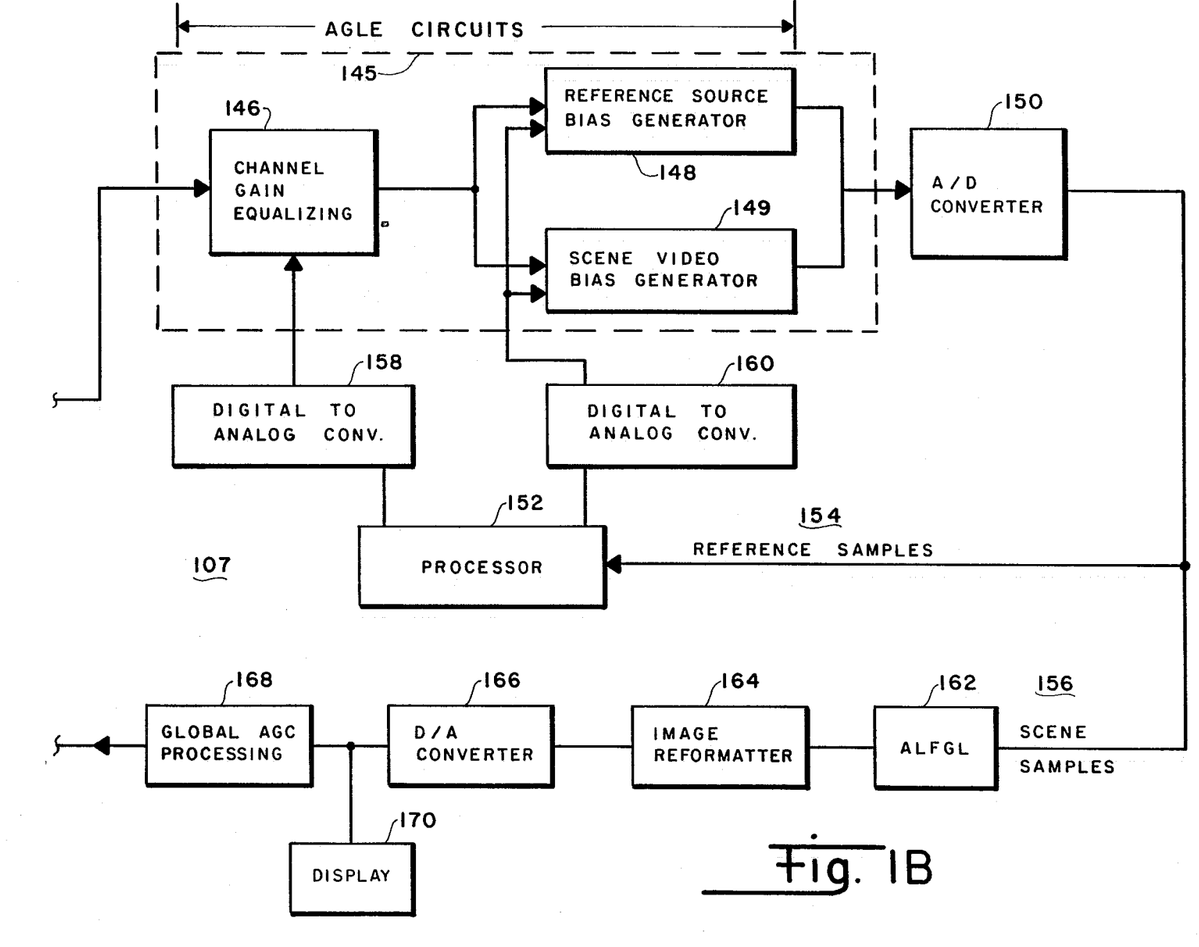

In FIG. 1 there is shown a video system of the forward looking infrared (FLIR) type for collecting, processing and displaying video information. The FIG. 1 apparatus generally includes a signal processing subsystem 107 which receives electrical signals from a radiant energy to electrical energy transducer array 103 by way of an amplifier bank 105. The transducer array 103 receives radiant energy from an infrared radiating scene 102 by way of a window or aperture arrangement 100 in a mounting structure 122. Information processed by the FIG. 1 system is presented in processed and reconstructed form for human viewing on a display 170.

The transducer array 103 in FIG. 1 includes a plurality of solid state sensor elements such as the elements 104 and 112 which receive infrared radiation by way of an optical system that is generally indicated by the lenses 108 and 110. The scene providing the infrared radiation is indicated at 102 to include viewed objects 111, 113 and 115, this scene being viewed through the aperture 116 in the mounting structure 122. The sensor elements 104 and 112 are provided with scanning capability as indicated at 106 to achieve ordered sampling of the scene 102 in a sequence of picture elements or pixels. The FIG. 1 apparatus contemplates that the sensing elements are aligned in a vertical column of, for example, one hundred twenty elements as indicated at 114; this vertical column of elements is mounted on gimbals and moved horizontally as indicated at 106 to form the scan lines of successive video signal frames. Alternately, relative horizontal movement of the sensing elements 104, 112, 114 and the scene 102 may be achieved with a moving optical member such as a prism or mirror while holding the sensor elements motionless. In such a moving mirror scanner, the mirror typically moves through arcs of ±5 to 6 degrees to achieve scanning. The lenses, sensors and mirrors used in the FIG. 1 apparatus are of the type which provide response to infrared radiation and therefore are fabricated from materials other than the conventional glass and silicon as is known in the infrared art.

The scene 102 in FIG. 1 is shown to visually include objects such as a house 111, a road 113 and an army tank 115. Scanning of these objects in either the gimbal or mirror scanning arrangement occurs by way of one hundred twenty parallel scan lines such as the lines 123 and 125 shown for the sensor elements 104 and 112. In an actual system, it is of course contemplated that the sensor elements 104 and 112 and the scan lines 123 and 125 will be separated by only a small vertical space in order that the scanning present a meaningful resolution of the scene 102. The FIG. 1 scanner can also be arranged to employ scan interlacing wherein each of the sensor elements performs sequential scanning on two adjacent lines; scan interlace can be achieved with sensor or optics movement in the vertical direction as is known in the scanning art. Interlaced scanning also allows realistically attainable spacing of the sensor elements 104, 112, 114 in the vertical direction. The large vertical space shown between the sensors and scan lines in FIG. 1 is of course unreal and is employed for drawing convenience and clarity. The FIG. 1 apparatus also contemplates that the scanning lines or sample paths 123. 125 will traverse not only the aperture 116 but will also extend onto the mounting structure 122 and will therein additionally include travel over a pair of reference signal sources 118 and 120 during the scan turnaround interval.

The scene 102 is shown in FIG. 1 as it would appear to a human viewer, that is, according to the visible light reflections of the house, tank and road scene objects. The sensors 104, 112 and 114, however, each include an infrared filter 101 in order that the visible spectrum components of the viewed image be rejected and the sensors respond only to infrared frequency radiant energy.

Electrical signal from a scanning solid state sensor element such as the sensor element 104 is typically of about one-quarter millivolt peak magnitude and is therefore coupled to a low level preamplifier 124 which includes an amplifier 130 in combination with alternating current (AC) coupling elements indicated generally by the capacitors 126 and 128. Signal from the preamplifier 124 is coupled to a higher-level post amplifier 132 and then to an electrical wave filter 134 and the multiplexer switch 142 in preparation for the signal processing subsystem 107. The multiplexer 142 also receives input signal from the remaining one hundred seventeen channels of the one hundred twenty-channel system as shown at 144. The post amplifier 132 is capable of providing variable gain in response to signal received on an automatic gain control (AGC) line 167. As indicated at 136, 138, 139 and 140, each of the one hundred twenty sensor elements includes a preamplifier, postamplifier and filter as was described at 124, 132 and 134 for the topmost sensor element 104. In the gimbal scanner arrangement of the FIG. 1 apparatus it is contemplated that all of the system components up through the multiplexer 142 are mounted on the gimbal supported structure in order that only one signal conductor, the output of the multiplexer circuit need be removed through the gimbal mechanism. Such a system also contemplates that the multiplexer output line may be used to carry the collected video information over a distance of several feet to the remainder of the processing system.

The multiplexer electronic switching or commutating device 142 is an electronic circuit that feeds samples of the one hundred twenty input signals indicated at 144 to an analog-to-digital converter 150 in the processing subsystem 107. The first stages of the processing subsystem 107 include gain and level equalizing circuits 146, 148 and 149, which comprise an automatic gain and level equalizing module (AGLE module) that is indicated at 145. Digital signals from the analog-to-digital converter 150 are coupled both to a feedback processor 152 and to an automatic low frequency gain limiting circuit 162; the feedback processor is responsive to the reference sample signals originating in the reference sources 118 and 120 while the automatic low frequency gain limiting (ALFGL) circuit 162 is responsive to signals originating with the scene 102 as indicated at 154 and 156.

The output of the feedback processor 152 is used to close both the channel gain equalizing feedback loop and the channel bias or level equalizing feedback loop by way of the digital-to-analog converters 158 and 160.

Signal from the ALFGL circuit is coupled to the scanning display 170 by way of an image reformatting circuit 164 and a digital-to-analog converter 166. The output of the digital-to-analog converter 166 is also used to close a slower third feedback loop that comprises the global automatic gain control circuit by way of the global AGC processing circuitry 168 and the AGC line 167.

The scene samples indicated at 156 are typically of ten bit resolution, that is, the analog-to-digital A/D converter 150 has ten output lines and is capable of resolving $2^{10}$ or 2E10 or 1024 different grey levels of scene video information. The terms A-D converter and ADC are also viewed herein to refer to an analog-to-digital converter.

Since the scanning display 170 is capable of resolving about 64 discrete gray levels, the ALFGL circuit is used to process the 1024 level scene sample video signal at 156 into 64 levels according to an image size or signal frequency component algorithm. This processing or compression utilizes the limited grey level capability of the display 170 for displaying the most important high frequency components at the expense of the low frequency less interesting components in the scene video signal. Typically an input signal of 60 dB dynamic range is compressed into a dynamic range of 36 dB in the ALFGL circuits 162. The circuitry of this block is also arranged to preserve video signal components of frequency higher than some predetermined value such as 3.5 KHz. The image reformatter circuit 164 serves to reformat the vertically organized samples from the solid state sensor elements 104, 112 and 114 into a horizontally organized pixel sequence for the scanning display 170.

The global AGC processing circuit 168 performs the function of maintaining reasonable contrast in the image produced by the scanning display 170, even though the contrast of external scenes (such as that shown at 102) is quite variable from one scene to another. The common gain of all 120 postamplifiers shown at 105 is commanded via the AGC line 167 to increase when the overall contrast of the image displayed at 170 is too low, and vice versa.

Figure 2:
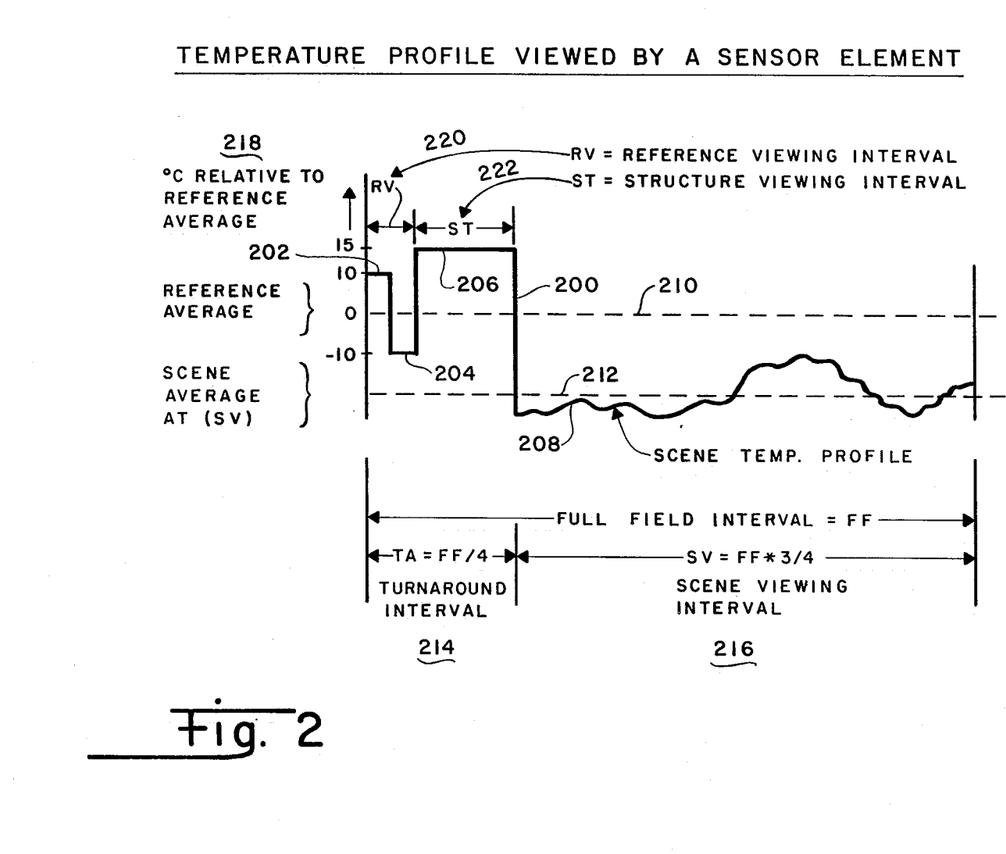
FIG. 2 is a signal waveform family relating to operation of the FIG. 1 system.

Operation of the FIG. 1 scanning and processing system can be understood with the assistance of the waveform shown in FIG. 2 of the drawings. The FIG. 2 waveform represents the video signal generated by one solid state sensor element, such as the element 104, during one horizontal scan of the typical infrared scene 102. The horizontal axis in FIG. 2 represents the time along one horizontal scan line and the vertical axis represents temperature, in degrees Celsius for example, with the temperatures referenced to the average between the hot and cold reference temperatures 202 and 204 as indicated at 210.

Assuming that the scanning of the transducer array 103 in FIG. 1 commences at the left edge of the mounting structure 122, the first encountered video signals shown in FIG. 2 are at the reference temperatures 202 and 204; these signals respectively represent the temperature of the reference sources 118 and 120 in FIG. 1. The temperature at 206 in FIG. 2 represents the portion of the mounting structure at 121 in FIG. 1 and the irregular temperature profile 208 indicates the return from the scene 102. The average temperature of the scene pixels is indicated at 212 in FIG. 2. The time of viewing the scene information is shown to be three-quarters of the full field or full scanning interval in FIG. 2 while the preliminary scanning of the reference temperature sources and the structure 121 is shown to require one-quarter of the full field interval as indicated at 214 in FIG. 2. As indicated at 222 the preliminary scan time or scan turnaround interval 214 is further divided into the time for viewing the hot and cold reference sources 118 and 120, the time interval 220, and the time of viewing the mounting structure segment 121, the time interval 222.

The abbreviations FF, TA, and SV are used to identify the full field, turnaround and scene viewing times in FIG. 2; these same abbreviations or symbols are also used as the name of variables in the mathematical equations below which relate certain of the FIG. 2 waveform features. In a similar manner the symbols RV and ST are used to designate the reference viewing interval and structure viewing interval 220 and 222 in FIG. 2; these terms also appear in the mathematical equations below. As also shown in FIG. 2, the symbol AT (SV) is used to indicate the scene average temperature 212.

It is contemplated that each solid state sensor element 104, 112, and 114 in FIG. 1 will view the hot and cold reference sources 118 and 120 at the scan start or at the scan finish, or alternately at both the scan start and scan finish. The reference sources are made to be uniform in temperature and are separated by a predetermined temperature difference; in FIG. 2 this temperature difference is indicated to be 20 degrees Celsius. This temperature difference between reference sources is preferably maintained as large as possible, without introducing system dynamic range problems, in order to achieve the best possible system accuracy for measuring channel gain equalization errors. The FIG. 1 apparatus further contemplates that the absolute temperature of the reference sources 118 and 120 will be allowed to change in response to the temperature of the mounting structure 121 and 122. Maintenance of these temperature relationships is accomplished through the use of closed loop temperature control systems which are known in the art but not shown in FIG. 1.

The temperature reference sources 118 and 120 are included in the FIG. 1 system to provide an ability to distinguish between large objects or background scenes of differing but constant temperature. For example, with use of the AC coupling indicated at 126 and 128 in FIG. 1, if the solid state sensor 104 views the naked sky with its relatively cold infrared temperature, and the sensor 112 views a desert sand dune of high infrared temperature the resulting output signals would be identical if a non-referenced processing system were employed, since the incorporated AC coupling removes the DC bias or reference component representing the sky and sand temperatures. With the incorporation of the reference sources 118 and 120, however, and a suitable selection of the AC coupling time constants for the capacitors 126 and 128, the difference between the reference source video signal and the sky in one sensor and the sand in another sensor becomes readily apparent, since the AC coupling capacitors in each channel of the system are identically conditioned by pre-scene exposure to the reference sources.

The reference sources 118 and 120 are shown symbolically in FIG. 1 to be located in close proximity to each other and to exist without the presence of intervening structure of intermediate temperature. A more practical embodiment of these sources might include an insulating member between the hot and cold reference sources and a corresponding gradual transition between the hot and cold reference temperatures at 202 and 204 in FIG. 2. Alternately, an optical switching means can be used for sequential viewing of hot and cold references at different locations.

The signal amplitude obtained when the FIG. 1 scanning encounters a scene object such as the house 111 is controlled by the global automatic gain control signal applied to the postamplifier 132 and its corresponding amplifier in each of the other scanner channels using the AGC line 167. The global AGC system responds to the scene contrast information along the path 156 and functions over the duration of several scans to maintain a predetermined average contrast in the scene video information displayed at 170.

The electric wave filters indicated at 134 in FIG. 1 serve to remove noise and other transient high frequency components from the video signal and assure that the filtered signal represents video pixels which can be adequately sampled (without aliasing) during commutation of the output signal between each of the indicated one hundred twenty input signals in the multiplexer 142.

Transducer efficiency variations are to be expected between solid state sensors in the array 103. These efficiency variations provide undesirably different signal levels from two channels which have viewed objects of identical infrared signal in the scene 102. To compensate for these efficiency variations, the channel gain equalizing circuitry 146 is used to amplify the signal from each different sensor by a selected degree of amplification capable of providing an equal output signal for equal scene temperatures. As indicated at 154, this channel gain equalizing is achieved using the signals provided by the hot and cold thermal references 118 and 120 using timed gating or sampling in the processor 152 to isolate the thermal reference signal portion of the FIG. 2 waveform. Following this channel gain equalizing, the difference between the two thermal reference signals should be the same for all channels, since each channel views the same references. In other words, the goal of gain equalizing is to equalize channel amplifier and sensor differences for all channels, thereby compensating for upstream differences in channel gains. The gain correction factor required in each channel is equal to the average (over all channels) reference difference divided by the reference difference for the particular channel. The goal of this correction is channel gain equalizing rather than the establishment of an absolute gain value for all channels. It should be noted that the channel gain equalizing circuits at 146 perform channel gain correction as distinguished from channel bias correction which may be necessary in addition to the gain correction because of channel-channel differences in circuit biases and because the absolute levels of the reference signals provided by each channel are effected (because of AC coupling) by the scene content for that particular channel.

The combination of the channel gain equalizing circuits and the channel bias generator circuits is identified as the AGLE or automatic gain and level equalizing circuits at 145 in FIG. 1.

To correct for channel bias level differences the circuits 148 are provided. To appreciate the combined function of the channel bias level equalizing circuits and the channel gain equalizing circuits it is significant to note that the analog-to-digital converter 150 is more limited in dynamic range than are any of the other components in the FIG. 1 system. The range of absolute signal levels which can be converted by the analog-to-digital converter (A/D) is fixed, for a particular signal level difference which corresponds to the least significant bit of the A/D. Large signal saturation of the A/D converter can easily occur in systems of the type shown in FIG. 1 and result in degraded and slow performance of the closed loops indicated in FIG. 1. In prior systems of the FIG. 1 type it would have been necessary to reduce the video gain to avoid A/D converter saturation by either the thermal reference signals or by peak signals from the scene 102. Such gain reduction causes degraded amplitude resolution in the digitized video signals from both the scene and the thermal references. Degradation of scene signals causes the minimum resolvable scene temperature (MRT) of the system to be increased, which degrades the detection, recognition and identification of targets. Degraded amplitude resolution of thermal reference signals also would increase the error in computing channel gains from the difference between thermal reference signals. This gain computation error would cause degradation in the channel gain equalization which in turn would cause degraded image uniformity.

In order to optimally utilize the limited dynamic range of the A/D converter it is desirable for the AC coupled video signal at the input to the A/D converter to be biased differently during the scene viewing interval than during the reference viewing interval. With such biasing, which can be very nearly perfect in both the scene and reference cases with the use of feedback techniques the A/D converter's limited dynamic range is used optimally in much the same way that AC coupling optimizes utilization of a preamplifier's dynamic range. In the FIG. 1 apparatus this optimizing eliminates the need to reduce video gain, thereby preserving a low minimum resolvable temperature (MRT) and permitting a larger temperature separation between thermal references. The larger reference separation in turn permits better gain equalization because of the resulting improvement in measurement of channel gains.

To accomplish the dual level reference viewing and scene viewing, switched biases for each FIG. 1 channel i.e. the average A/D converter output resulting from thermal reference viewing should be centered on the A/D converter range to permit maximum separation between thermal reference temperatures. In other words, if the average A/D output resulting from a particular channel's viewing of the two thermal references is not so centered, but is offset from the center of the A/D converter range, the required change to the input bias at 148 in FIG. 1, for thermal reference viewing by that channel is equal to the amount of the offset. Once the proper A/D converter input biasing for thermal reference viewing has been established, the signals from both references will be out of saturation if the reference separation was properly chosen. By way of the gain equalizing at 146 the difference between the two signals should therefore be the same for all channels, since all channels view the same references.

Considering now typical operating times and magnitudes for the feedback closed loops shown in FIG. 1, the global AGC signal applied on the line 167 has been indicated to be of a slow-acting average over many scans of the transducer array 103. The time constant for this AGC signal is determined by components in the global AGC processing circuit 168; generally these components are selected such that the AGC bias signal on the line 167 responds to scene contrast changes that persist for several scanning frames. The AGC processor typically is arranged to limit system output variations to the range of 4 dB in response to input variations as large as 34 dB and to come within 3 dB of a final value within 250 to 500 milliseconds after an input step change as large as 34 dB. Since the FIG. 1 scanner is contemplated to operate at a 33.3 millisecond frame rate, or a 16.6 millisecond field rate, the AGC times encompass several frames of video information.

The processor 152 in contrast to this slow AGC provides newly updated gain equalizing and channel bias signal generating information to the digital-to-analog converters 158 and 160 for each scan of the transducer array 103. These newly supplied signals are modified in response to changes in the reference signal data of each scan. These signals are preferably arranged to correct responsivity differences between sensor elements and gain differences between amplifier channels, which total in the range of ±40 percent from nominal, to deviations of normalized gains; with an average normalized gain difference, between adjacent channels, of 0.5 percent or less and with normalized gain differences over the entire field being 2.0 percent or less of the average normalized gain. Level differences between channels are compensated in the bias generators 148 and 149 such that random variations from channel to channel of ±25 percent of ADC range are reduced to less than 0.5 percent between adjacent channels and are less than 2.0 percent over the entire field. Both the gain correction and level correction could be arranged to retain an attained correction value or to continuously update and modify the correcting values; the latter being preferable as indicated above.

The arrival at a final value of gain and bias signal may require several passes or iterations for achieving the desired value. The correction to be implemented on each iteration may be for example one-fourth of the perceived bias error in order to limit the bandwidth of the bias correction feedback loop. A bandwidth limitation is needed because a full frame time of typically one-thirtieth of a second is required to determine the results of each correction. Bandwidth limiting or attenuation of the correction also keeps the correction loop from being excessively responsive to noise generated from the detector, the preamplifier, multiplexer, or A/D quantization. The location of the channel gain equalizing and bias generator circuits downstream of the AC coupling networks in each channel precludes the introduction of transients into the AC coupling network from the operation of gain equalizing and bias generation. The iterative correction sequence described above can occur even if one of the reference signals initially places the A/D converter in saturation; initial saturation can reduce the size of the first correction increment and thereby slow the iterative process, however, the iterative correction process will yet be operative and will still be stable.

Once a proper gain equalizing is achieved and a proper A/D converter input bias for thermal reference viewing has been established, the signals from the references will be out of saturation, assuming the difference between the reference signal temperatures is within the dynamic range of the A/D converter.

The difference between the average value of the reference signals 210 in FIG. 2 and the average scene temperature 212 are operative in preventing saturation of the A/D converter 150 in FIG. 1. Ideally, the reference average 210 and the scene average 212 would be equal and the A/D converter need only respond to the maximum signal excursions of the reference signals and the scene video signal. In a practical situation this occurrence of equal reference average and scene average temperatures is not found and compensation as described herein for both channel gain/level deviations and average values that differ is required for optimum use of the A/D converter. The use of peak (maximum and minimum) values for the scene video signals would of course be desirable in optimizing these signals for the A/D converter; average values are, however, elected in lieu of these peak values in the FIG. 1 system because no measure of scene signal peaks is available to the processor 152 of FIG. 1. In other words, the described average value based processing is usually satisfactory because the scene signals tend to have a collective distribution which is reasonably symmetrical about the scene average.

The bias generator circuits 148 and 149 in FIG. 1 may be fabricated using operational amplifier circuits which are capable of responding to mathematically additive and subtractive signals at an input port summing node in the manner known in the electronic art. The channel gain equalizing circuit 146 may employ an electronic multiplier circuit, preferably of the analog four-quadrant multiplier type. Since the information received from the multiplexer 142 is in serial analog form and the reference sample information received at 154 is in serial digital form, circuits of fast acting, high frequency response are desirable for the channel gain equalizing and bias generators at 146, 148 and 149 in FIG. 1.

The reference sample values on the path 154 are used in the processor 152 to produce digital values for channel gain equalizing and bias generating; storage of one hundred twenty such digital values for the gain equalizing circuits 146 is required in the processor and the storage of one hundred twenty plus one hundred twenty or two hundred forty digital values for the two bias generating circuits 148 and 149 is also required.

The processor 152 which computes and stores the values may be comprised of a microprocessor with related input/output and memory circuits and is arranged to perform the following operations in the FIG. 1 system:

1. Compute the average hot-cold reference difference for all channels, from the reference signals provided by the A/D converter 150;

2. Compute and provide to the D/A converter 158, in synchronism with the video multiplexer 142, the 120 multiplicative gain-equalization factors which cause the hot-cold reference difference in each channel to equal the average difference from step 1. The final value of the factor for each channel equals the reference difference average over all channels divided by the initial reference difference for that particular channel. The value is produced by an iterative closed-loop process in which the percentage change in each factor is a specified fraction of the residual percentage gain error measured for the corresponding channel;

3. Compute and provide to the block 148 reference source bias generator the channel bias correction values required to center the average of hot and cold reference signals for each channel on the input range of the A/D converter 150. The bias to be added on each iteration equals the bias added in the same channel on the previous iteration plus a specified fraction of the resulting difference between A/D center and the average reference value for that channel;

4. Compute and provide to the block 149 scene video bias generator the channel bias correction values required to center the collective average scene signal from all channels on the input range of A/D converter 150. The channel-to-channel differences between bias correction values must be maintained as they were established in step 3. The common difference between the bias values of step 4 and the corresponding values of step 3 is described by equation 6, which is derived and explained below, as a linear function of the average bias correction of step 3.

The signal processing subsystem 107 may be fabricated with commercially available components such as standard integrated circuit chips which are sold by the electronic circuit manufacturing corporations known in the electronic art. This subsystem may also employ a common Module Digital Scan Converter (CMDSC) which has been developed by the U.S. Army Night Vision Laboratory at Fort Belvoir Virginia. The CMDSC is described in a series of developmental specifications published by the Night Vision Laboratory, specification number B2-28A050123, revision 3. Jan. 6, 1984 being current at the time of drafting the present patent specification. The Night Vision Laboratory specification is hereby incorporated by reference into the present patent specification.

Mathematical Equations

AC coupling forces the steady-state average voltage in each channel of FIG. 1 to zero except for circuit bias errors downstream of the last AC-coupling stage, which are small (in terms of equivalent temperature) in comparison to the large temperature difference which can exist between an external scene and thermal references whose temperatures are controlled with respect to internal structure temperature. The particular circuit biases just mentioned will be ignored in the discussion to follow, with the additional justification that only their average value over all channels needs to be small in comparison to possible differences between internal and external temperatures.

Since the average voltage in each channel over a full field time will be zero automatically, the average voltages during the scene-viewing and reference-viewing portions of the field will both typically be nonzero. The average voltage during reference viewing can easily be adjusted to zero in block 148 of FIG. 1, since reference sample values are provided to the processor 152. To simplify this discussion, the center of the input range of the A/D converter 150 is taken to be zero volts. Once all channels have been gain-equalized and have also been biased such that the average between hot and cold references in each channel equals zero, then all channels have also been level-equalized. If all channels are linear or exhibit the same nonlinearity, then all channels will provide the same voltage when viewing the same object (whether it be an internal thermal reference or a portion of the external scene).

It would be improper to force the average scene-viewing voltage in each channel to zero, or to any other common value since different channels view different portions of the external scene. It is proper to force the global scene-viewing average over all channels to zero, however, while maintaining the gain and level equalization already established. This can be done by using channel-dependent bias corrections in block 149 which differ by a common additive value from the corresponding bias corrections used in 148 of FIG. 1—where these two blocks are operative during different time intervals. The required value of the common bias shift between reference-viewing and scene-viewing time intervals can be determined from the thermal reference sample values alone, without processing the samples of scene data (which are more numerous, by orders of magnitude). The mathematical equation describing the common bias shift will now be derived, with reference to FIG. 2. The average reference level is shown in that figure as the zero level for measurement of temperature, or the voltage equivalent of temperature, which corresponds to the situation that would exist at the A/D converter input if the channel-dependent bias corrections appropriate for use in block 148 were to be used in block 149 also.

A series of mathematical equations based on the FIG. 2 video scan and relating the scene average temperature and the thermal reference average are shown below. In these equations the two letter parenthetical terms such as (SV) and (FF) refer to time intervals defined in FIG.

2 and are therefore to be distinguished from the algebraic use of parentheses for multiplication. For example, AT(FF) refers to the average temperature viewed by a particular channel during a full field time of the FLIR.

For a system in which the two reference temperatures are controlled to be 20° C. apart, with their average 15° C. below the adjoining structure temperature:

$$AT(FF) = ((10° C. - 10° C.).RV/2 + (15° C.).ST + AT(SV).FF.\tfrac{3}{4})/FF \quad (1)$$

$$= AT(SV).\tfrac{3}{4} + (15° C.).ST/FF \quad (2)$$

For a scanner where ST/FF is equal to 0.16 it follows that $$AT(FF) = AT(SV).\tfrac{3}{4} + 2.4° C. \quad (3)$$

In rearranged form equation 3 becomes:

$$AT(SV) = AT(FF). 4/3 - 3.2° C. \quad (4)$$

For a one hundred twenty-channel system (i.e. N=120) one hundred twenty different biases are required to equalize the signal levels for all channels, while maintaining the A/D converter centered on its input range during scene viewing. The A/D converter is also to remain centered on its input range during reference viewing and hence one hundred twenty different biases are required. The bias change between scene viewing and reference viewing is, however, the same for all channels. The value of this bias change for the one hundred twenty channels can be determined from equation 4.

If AG is defined to be the global average value of AT(SV) over the N (e.g. N=120) channels then:

$$AG = AVG(AT) \quad (5)$$

Rewriting equation 4 for average values gives $$AG(SV) = AG(FF).4/3 - 3.2° C. \quad (6)$$

The 4/3 AG(FF) term in equation 6 can be separated into two parts, to permit a useful rearrangement of equation 6

$$AG(SV) - AG(FF) = \tfrac{1}{3}.AG(FF) - 0.16 - 1.AVG(DR)3.2° C. \quad (6)$$

Without the channel-dependent bias corrections being inserted at blocks 148 and 149 of FIG. 1, AG(FF) would have been equal to zero because of AC coupling. In the previously explained mathematical context, AG(FF) equals the average of the bias corrections required to make the reference average equal zero in all channels. Since the term AG(SV) represents the global average scene-viewing signal that would exist without a common bias shift between reference viewing and scene viewing, it also represents the common quantity to be subtracted from the one hundred twenty additive channel-dependent bias corrections appropriate for use in 148 to form the one hundred twenty additive channel-dependent bias corrections appropriate for use in 149. The common bias shift is therefore to be computed according to equation 6, in which AG(FF) is simply computed once per frame) as the average of the one hundred twenty reference viewing bias corrections required to null the reference average for each channel. The values of the multiplicative and additive constants in equation 6 depend on the detailed arrangement of the scanner and thermal references in a particular system. Equations (1)-(6) show how greater use may be made of the thermal reference signals than has been accomplished previously in order to obtain improved FLIR system performance. The AC coupled FLIR channel signals are shown in equations (1)-(6) to incorporate a subtle capability for determining how much the average scene signal differs from the average thermal reference signal. This average difference once obtained in signal form, can be used advantageously for optimizing utilization of the A/D converter. Equations (1)-(6) show that commencing with video signal waveforms, typified by FIG. 2 in the disclosed FLIR system, it is possible to determine level equalizing bias values to be used in each channel and for all channels in order to obtain optimum A/D converter performance. The mathematical process for obtaining this correction signal can be stated in words by the following sequence of steps.

1. Equalize the gains of all channels, as described.
2. Equalize the signal levels for all channels during thermal reference viewing as described, such that the average reference signal from each channel is centered on the input range of the common A/D converter.
3. Change all the channel-dependent bias corrections used during reference viewing by the same amount, which (for a particular system configuration) is a particular linear function of the average bias correction for reference viewing. Use of the resulting modified channel-dependent bias corrections during scene viewing, to center the global average scene signal from all channels on the A/D input range.

Alternate Embodiments

In the above described embodiment of the invention, one hundred twenty digital bias values developed during scan turnaround viewing of the reference signal sources 118 and 120 are to be supplied at the input of each of the bias generators 148 and 149 in synchronism with channel multiplexing. Similarly, one hundred twenty digital values are to be supplied to the gain equalizing circuit 146. Each of these one hundred twenty gain equalizing or correction factors is to be outputted in parallel with the two corresponding bias values. The gain correction factors to be used for scene viewing are the same as those used for thermal reference viewing during the turnaround interval. The two bias values are different, but are related as described by equation 6. As an alternate of this two-value computation arrangement, in situations where the processor 152 is incapable of forming the second set of digital bias values from the first set with sufficient speed or has insufficient memory capacity, a combination of analog and digital implementation using a single set of one hundred twenty digital bias values can be employed. In this combination, or hybrid scheme, the processor 152 is yet required to compute the one hundred twenty individual biases required during turnaround, and in addition compute a common difference value between the two sets of required biases. In this arrangement therefore the turnaround biases would be outputted as in the all digital implementation, however, the common difference is outputted as a one hundred twenty-first value (but preceeding the one hundred twenty values in time) and passed through an additional D/A converter; this output is summed in analog fashion with the one hundred twenty sequenced analog turnaround biases during scene viewing time only. This summation may be switched out during turnaround, or the input to the new D/A converter may be nulled by the processor during turnaround. The one hundred twenty-first output would of course be updated once per frame.

In another alternate embodiment of the invention for use in applications where processing speed permits, the level equalization may be based on thermal reference samples located at each end of a scan. The image resulting from this arrangement will be more uniform in the center of the scan area, however, the degree of perfection achievable on one side of the image is somewhat diminished with such a two-end reference arrangement.

Summary and Expectations

The described equalization scheme provides desirable image uniformity under static viewing conditions, especially on one side of the image. Changes in scene content, caused by sensor slewing for example, will produce transient errors in the achieved level equalization. The magnitude of these errors will depend on several variables including the distribution of scene objects, the sizes of these objects relative to the field of view, and the magnitude of the camera slew rate. The duration of the resulting transients after scene stabilization will depend on the time constants of the AC coupling networks and the time constants of the gain and level correction loops.

In the disclosed embodiment of the invention, image level uniformity for static scenes is best on the side of the image which is adjacent the scan turnaround wherein the thermal references are sampled, unless all sensors see the same temperature profile from one side to the other. Achievement of the same degree of level uniformity on the opposite image side is more difficult because of the video level droop associated with the AC coupling networks. Large AC coupling network time constants minimize this droop and therefore minimize such uniformity variations on the opposite side of the image, but also maximize image settling time after scene changes and following system startup. The time constants are therefore preferably selected for each application of the apparatus to provide the best compromise between optimized static image uniformity and optimized transient response to scene changes. It should be realized that the need for compromise is not created by use of this invention, however, the performance improvement available with use of the invention is affected by the preexisting need to make such compromise.

As will be apparent to persons skilled in the electronic art, the present invention may be applied in many environments other than the described forward looking infrared scanner; these environments may possibly include but are not limited to: television signal processing, geophysical uses such as mineral exploration or oceanography, X-ray device signals (such as the computer aided tomograph or CAT Scanner), and sonar apparatus signals. The term video as used herein may be seen therefore to be generic to many types of signals.

One aspect of the present invention accordingly concerns the fuller use of information contained in AC coupled signals. This use is enabled by recognition of a subtle point concerning such signals; that it is possible to determine from reference source signals alone how much difference exists between the average value of observed scene signals and the average value of the reference signals. Proper use of this formerly wasted signal information permits AC-coupled video signals at the input of a limited range analog-to-digital converter to be biased differently during scene viewing than during reference signal viewing and thereby achieve enhanced system performance.

While the apparatus and method herein described constitute a preferred embodiment of the invention, it is to be understood that the invention is not limited to this precise form of apparatus or method, and that changes may be made therein without departing from the scope of the invention which is defined in the appended claims

What is claimed is:

1. A method for decreasing the dynamic range of a scene video signal for processing said signal in a channel of limited dynamic range comprising the steps of:
   including in the scene video signal at the point of origin thereof a pair of reference signals of predetermined video intensity difference,
   separating the transient alternating current component of the video signal from the direct current reference component;
   discarding the direct current reference component;
   adding a first new direct current reference component signal to said transient alternating current component during the signal time portions corresponding to said reference signals;
   adding a second new direct current reference component signal to said transient alternating current component during the signal time portions corresponding to scene video;
   whereby the overall dynamic range of the processed video signal from said adding of first and second new reference component signals is of limited amplitude.

2. The method of claim 1 wherein said first and second direct current reference component signals are respectively selected to locate the average values of said reference component signal and said scene video signal at the midpoint of said limited dynamic range processing channel.

3. The method of claim 2 wherein said scene video signal is comprised of a plurality of scan segment signals and wherein said reference signals are located near one end of each said scan segment signal.

4. The method of claim 3 wherein said step of including reference signals includes scanning a pair of reference signal sources of variable absolute video intensity and predetermined video intensity difference.

5. The method of claim 4 further including the step of equalizing the signal channel gains between a plurality of separate video signals representing scan segments of said scene using said pair of reference signals as an equalization measurement.

6. The method of claim 5 wherein said step of equalizing is accomplished prior to said steps of adding first and second reference component signals.

7. The method of claim 6 wherein said scene video signal represents an infrared emitted energy scene.

8. The method of claim 7 wherein said processing channel of limited dynamic range includes the converting of said video signal from analog to digital form 9. Apparatus for processing infrared scene video signals of wide dynamic range comprising:
   N channel scanning means for generating N electrical signals each representing sequential video pixels of said infrared scene taken along a plurality of adjacent scanning paths;

reference signal generating means including a pair of reference infrared sources of predetermined temperature difference and located near an end of said scanning paths for incorporating in each of said N video signals a pair of electrical signals representing a predetermined temperature difference;

video amplifier means including N AC coupled amplifiers for amplifying and extracting the transient AC component signal from each of said N electrical signals;

automatic gain control means responsive to said reference signal amplitude difference for equalizing the channel gains in said N channel scanning means;

means for adding a first new direct current reference signal to each of said transient AC component signals during the time interval corresponding to said reference signal pair therein;

means for adding a second new direct current reference signal to each of said transient AC component signals during the time interval corresponding to said scene video signals, said AC component signal with said added first and second new reference signals comprising a reconstituted signal;

signal multiplexer means for arranging samples of said N signals into an ordered serial signal;

analog-to-digital converter means for converting said ordered serial signal into a sequence of digital signals whereby the dynamic range required of said analog-to-digital converter can be substantially reduced with the selection of appropriate values for said first and second direct current reference signals.

10. The apparatus of claim 9 further including feedback means for generating said first and second direct current reference signals.

11. The apparatus of claim 10 wherein the magnitude of said first and second direct current reference signals is selected to locate the average value of said reference pair signals for each of the N channels and the global average value of said scene video signal each at the midpoint of the dynamic range of said analog-to-digital converter means.

12. The apparatus of claim 11 further including means for updating the values of said first and second reference signal for each new scan.

13. The apparatus of claim 9 wherein said signal multiplexer means is located prior to said automatic gain control means and said means for adding first and second new reference signals; said automatic gain control means and said means for adding including means responsive to said ordered serial signal.

14. The apparatus of claim 13 wherein said automatic gain control means and said means for adding first and second new reference signals are located between said multiplexer means and said analog to digital converter means; said automatic gain control means and said means for adding first and second new reference signals including means responsive to said sequence of digital signals.

15. The apparatus of claim 14 wherein said automatic gain control means includes an electronic multiplier circuit and digital memory means for storing gain determining signal magnitudes corresponding with said sequence of digital signals.

16. The apparatus of claim 15 wherein said means for adding first and second new direct current reference signals include an analog operational amplifier, a digital-to-analog converter and digital memory means for storing first new direct current reference signal related values and second new direct current reference signal related values.

17. The apparatus of claim 9 wherein said scanning means include means for generating linear horizontally-oriented scans and wherein said pair of reference infrared sources are located near one end of said scans within a turnaround portion thereof.

18. The apparatus of claim 17 wherein said reference signal generating means includes feedback means for changing the temperature of said reference infrared sources in response to environment changes while maintaining uniform reference source surface temperature and constant reference source pair temperatures relative to internal structure viewed during the remainder of the scan turnaround.

19. The apparatus of claim 9 further including global automatic gain control means, of slower time constant than said reference signal automatic gain control means, for controlling the gain of said N AC coupled amplifiers in group in response to the image contrast in said scene video signals.

20. DC restorer apparatus for processing a scene video signal of wide dynamic range using components of lesser dynamic range comprising:

reference video means for including in the scene video signal a pair of reference signals of predetermined video intensity difference;

AC coupling means for separating the alternating current component of the video signal from the direct current reference component and for discarding the direct current reference component;

means for generating and adding to said transient alternating current component signal a first new direct current reference component signal during the signal time interval corresponding to said reference signals;

means for generating and adding to said transient alternating component signal a second new direct current reference component signal during the time interval corresponding to scene video;

whereby large amplitude DC components of said scene and reference composite video signal may be replaced with DC components of smaller preferable magnitude.

21. Electronic scanning apparatus comprising:

a plurality of transducer elements each capable of producing a video signal electrical output representing successive pixels of an aperture framed input scene scanned along predetermined sampling paths traversing said aperture;

a pair of uniform intensity reference signal sources located adjacent said aperture and scanned sequentially by said transducer elements near one end of each of said sampling paths, said reference sources being maintained at a predetermined intensity difference;

gain controllable AC coupled channel signal amplifier means including an amplifier coupled with each of said transducer elements for removing the DC reference component and controllably amplifying the AC transient component of each transducer element video signal;

multiplex channel commutating means for sampling said plurality of transducer element amplified video signals and generating an output signal comprised of segments sequentially taken therefrom;

DC coupled signal amplifier means including a gain control input and a DC level control input for generating from said multiplexer signal a newly DC referenced scanning output signal;

first loop automatic gain control means connected with said scanning output signal and said gain control input of said DC coupled signal amplifier means and responding to reference source intensity difference components in said output signal, for gain adjusting said DC coupled signal amplifier means in compensation for transducer element differences;

second loop level control means connected with said scanning output signal and said DC level control input of said DC coupled signal amplifier means for generating a first level control signal complementary to the overall average intensity of said reference signal sources for each said transducer and a second level control signal biased with respect to said first level control signal to be complementary to the scene sampling path average intensity for all transducer elements, for relating said scanning output signal to a common reference for said multiplexed channels;

third loop automatic gain control means connected with said scanning output signal and said AC coupled signal amplifier means and responding to scene contrast data for controlling the gain of said AC coupled amplifier and the image contrast in the output signal of said amplifier.

* * * * *

UNITED STATES PATENT AND TRADEMARK OFFICE
CERTIFICATE OF CORRECTION

PATENT NO. : 4,963,963                        Page 1 of 2

DATED : October 16, 1990

INVENTOR(S) : William J. Dorman

It is certified that error appears in the above-identified patent and that said Letters Patent is hereby corrected as shown below:

Col 2, line 46, "particular." should read ---particular,---.

Col 2, line 66, "deVice" should read ---device---.

Col 4, lin 51, "123. 125" should read ---123, 125---.

Col 9, line 10, "techniques" should read ---techniques,---.

Col 12, line 41, "value" should read ---value,---.

Col 13, line 10, "AT(FF)=((10°C.-10°C.).RV/2+(15°C.).ST+AT(SV).FF.¾)/FF" should read ---AT(FF)=((10°C.-10°C.)·RV/2+(15°C.)·ST+AT(SV)·FF·¾)/FF---.

Col 13, line 12, "=AT(SV).¾+(15°C.).ST/FF" should read ---=AT(SV)·¾+(15°C.)·ST/FF---.

Col 13, line 17, "AT(FF)=AT(SV).¾+2.4°C." should read ---AT(FF)=AT(SV)·¾+2.4°C.---.

Col 13, line 21, "AT(SV)=AT(FF).4/3-3.2°C." should read ---AT(SV)=AT(FF)·4/3-3.2°C.---.

Col 13, line 42, "AG(SV)=AG(FF).4/3-3.2°C." should read ---AG(SV)=AG(FF)·4/3-3.2°C.---.

UNITED STATES PATENT AND TRADEMARK OFFICE
CERTIFICATE OF CORRECTION

PATENT NO. : 4,963,963

DATED : October 16, 1990

INVENTOR(S) : William J. Dorman

It is certified that error appears in the above-identified patent and that said Letters Patent is hereby corrected as shown below:

Col. 13, lines 47-48, "AG(SV)-AG(FF)=1/3.AG(FF)-0.16
1.AVG(DR)3.2°C." should read
---AG(SV)-AG(FF)=1/3·AG(FF)-3.2±C.---.

Signed and Sealed this

Ninth Day of June, 1992

Attest:

DOUGLAS B. COMER

Attesting Officer

Acting Commissioner of Patents and Trademarks